United States Patent Office 2,766,635
Patented Oct. 16, 1956

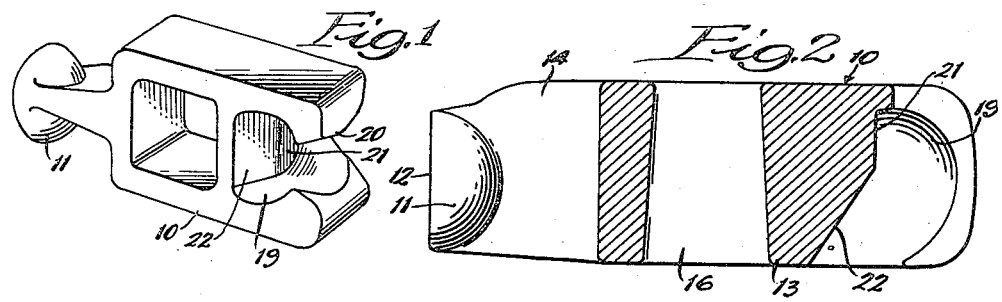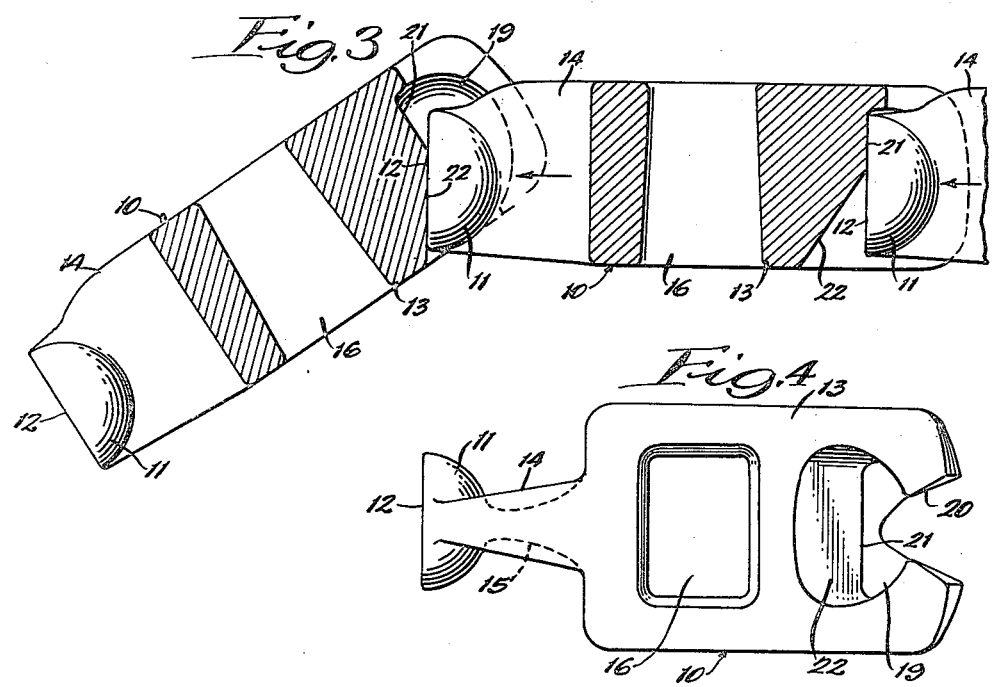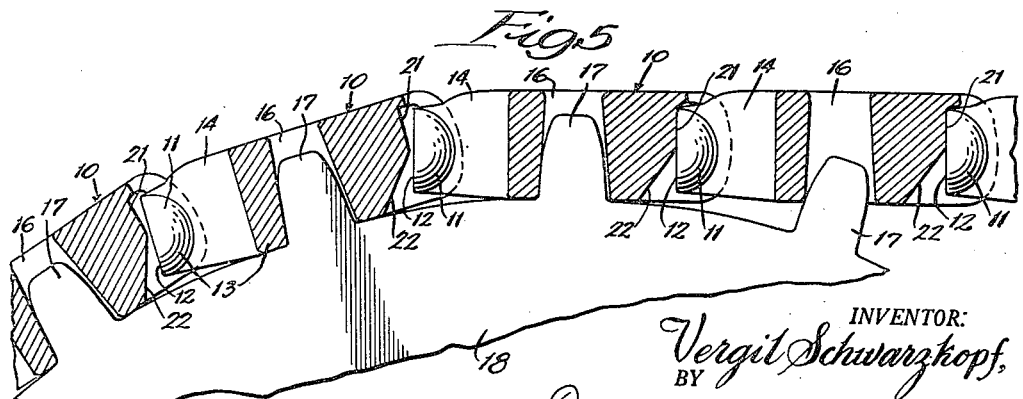

2,766,635

CONVEYOR CHAIN

Vergil Schwarzkopf, La Grange, Ill., assignor to The Lathrop-Paulson Company, Chicago, Ill., a corporation of Illinois Application October 22, 1954, Serial No. 463,856

4 Claims. (Cl. 74—246)

This invention relates to a conveyor chain, and more particularly to a form of link in such a chain.

In the use of conveyor chains in modern plants, it is usually necessary to advance the chain in one direction and then to reverse the movement of the chain, and in these operations the chain is pushed or pulled by the sprocket wheel. In the reversal of movement of the chain, and particularly where the chain is pushed, it is found that the chain often becomes disengaged and considerable damage has been caused by the disengagement of the links. Such disengagement very often occurs as the chain passes over a portion of a sprocket wheel where the links extend at an angle to each other and during the period of change of direction of movement of the links.

An object of the present invention is to provide a chain or chain link structure overcoming the above described difficulties and preventing separation of the links during the various operations or changes in operation described. A further object is to provide a chain link structure in which the links are securely held together irrespective of the direction of movement or change in direction of movement, while at the same time permitting ready disengagement when this is desired. A still further object is to provide a chain structure in which the links do not lose pitch when pushed or passed about a sprocket wheel and in which the link structure is provided with locking means against disengagement while at the same time permitting wide angular link movement. A still further object is to provide in a link structure socket thrust surfaces which are angularly arranged, whereby effective pushing operation of the chain is brought about while at the same time providing a different angular thrust surface which is effective when the chain is traveling about a circular body such as a sprocket wheel. Other specific objects and advantages will appear as the specification proceeds.

The invention is shown, in an illustrative embodiment, by the accompanying drawing, in which—

Figure 1 is a perspective view of a chain link embodying my invention; Fig. 2, a longitudinal sectional view; Fig. 3, a longitudinal sectional view of a plurality of links and showing one link being disengaged from the other; Fig. 4, a bottom plan view; and Fig. 5, a longitudinal sectional view of a series of links in connected relation and in engagement with a portion of a sprocket wheel, the links being shown on a reduced scale.

In the illustration given in Figs. 1 to 5, inclusive, the link 10 is provided at its forward end with a semicircular head 11, having a flat forward surface 12. The head 11 is connected to the block body 13 by a neck 14 having concave sides, as indicated by the dotted lines 15 in Fig. 4. The block 13 is apertured at 16 to enable the chain link to receive the sprocket 17 of the sprocket wheel 18, so that the link may be pulled or pushed thereby.

The link body is shown in greater detail in Paulson Patent No. 1,956,298.

At the rear of the link 10 is a socket 19, and the rear wall of the block is cut away to provide a flared opening 20 adapted to receive the neck 14 of an adjacent link, as shown best in Figs. 3 and 4.

The socket 19 is somewhate semispherical in shape so as to receive the head 11 of the adjacent link. The forward wall of the link within the socket 19, as shown best in Fig. 3, has an upper, generally vertical portion 21, and a lower inclined portion 22. The angularly-relating walls 21 and 22 at the front of the socket thus provide two abutment surfaces. When the links are in horizontal position, as shown in Fig. 3, the abutment surface 21 is contacted by the front flat surface 12 of the link, while when the links are in angular or tilted position, as shown on the left-hand side of Fig. 3, the front surface 12 of link 12 abuts the angular surface 22. Thus in passing about sprocket wheels where the pitch becomes steep, an engagement such as is shown in Fig. 3 on the left-hand side is presented, while in the horizontal position an engagement such as is shown on the right-hand side of Fig. 3 is brought about. Further, the inclined wall 22 provides a release opening which is effective in guiding the flat surface 12 of the head 11 downwardly for disengagement, as illustrated in Fig. 3 at the forward end of the link. For manual disengagement, the link 10 may be swung to the position shown in Fig. 3 and the two links then separated by vertical movements.

In the operation of the chain as above described, it is found that there is substantially no tendency for the links to become disengaged during the operation of the chain under any of the circumstances described, and particularly during the periods of reversal in movement of the chain. Further, the multiple angular surfaces in the sockets of the chain permit pushing of one link by the other, even though the angles between the two may be widely varied. Further, should disengagement of links be desired, this is greatly facilitated by providing the inclined guide surface 22 for engagement with the forward flat surface 12 of the link head 11.

While, in the foregoing specification, I have set out a specific structure in considerable detail for the purpose of illustrating the invention, it will be understood that such details of structure may be varied widely by those skilled in the art without departing from the spirit of my invention.

I claim:

1. In a conveyor chain, a link having a main block portion, a head generally in the shape of a semisphere at the forward end of the block and connected thereto by a neck, said head having a flat forward side, said block having at its rear a socket partially open to receive the neck of an adjacent similar link, and said socket having at its forward side angularly related wall portions, the upper portion being substantially at right angles to the top of the link block and the lower portion being inclined downwardly and forwardly therefrom.

2. In a conveyor chain, a link having a main block portion apertured to receive the tooth of a drive sprocket, a head generally in the shape of a semisphere with the flat portion thereof forward, a neck connecting said head to the main block portion, said block portion having at its rear a socket having an outwardly-flared opening for receiving the neck of an adjacent link, said socket having at its forward side angularly related wall portions, the upper portion being substantially vertical and the lower portion being inclined downwardly and forwardly therefrom.

3. In a conveyor chain, a link having a main block portion, a head generally in the shape of a semisphere at the forward end of the block and connected thereto by a neck, said head having a generally flat forward side, said block having at its rear a socket partially open to receive the neck of an adjacent similar link and being concave at its rear to receive the head of said link, and said socket having at its forward side angularly-related wall portions, the upper portion being substantially vertical and the lower portion being inclined downwardly and forwardly therefrom.

4. In a conveyor chain, a link having a main block portion apertured to receive the tooth of a drive sprocket, a head generally in the shape of a semisphere, with the flat portion thereof forward, a neck connecting said head to the main block portion, said block portion having at its rear a socket rounded to snugly receive the head of an adjacent link and having an outwardly-flared opening for receiving the neck of said adjacent link, said socket having at its forward side angularly-related wall portions, the upper portion being substantially vertical and the lower portion being inclined downwardly and forwardly therefrom.

References Cited in the file of this patent

UNITED STATES PATENTS

| | | |
|---|---|---|
| 1,956,298 | Paulson | Apr. 24, 1934 |
| 2,695,095 | Anderson | Nov. 23, 1954 |